(12) United States Patent
Jaeger

(10) Patent No.: US 7,574,328 B2
(45) Date of Patent: Aug. 11, 2009

(54) PEAK PATTERN EVALUATION USING SPRING MODEL

(75) Inventor: Rainer Jaeger, Loveland, CO (US)

(73) Assignee: Agilent Technologies, Inc., Santa Clara, CA (US)

(*) Notice: Subject to any disclaimer, the term of this patent is extended or adjusted under 35 U.S.C. 154(b) by 635 days.

(21) Appl. No.: 11/299,160

(22) Filed: Dec. 9, 2005

(65) Prior Publication Data

US 2006/0126065 A1 Jun. 15, 2006

(30) Foreign Application Priority Data

Dec. 10, 2004 (EP) .................................. 04106453

(51) Int. Cl.
*G06F 15/00* (2006.01)
(52) U.S. Cl. ...................................................... 702/193
(58) Field of Classification Search ................. 702/193, 702/19, 21, 23–25, 27, 33, 44, 189; 703/2, 703/7, 9, 11
See application file for complete search history.

(56) References Cited

U.S. PATENT DOCUMENTS

| | | | | |
|---|---|---|---|---|
| 4,008,388 | A * | 2/1977 | McLafferty et al. | 702/27 |
| 5,119,315 | A | 6/1992 | Kemp et al. | |
| 6,161,080 | A * | 12/2000 | Aouni-Ateshian et al. | 703/11 |
| 6,210,465 | B1 * | 4/2001 | Altmayer | 95/82 |
| 7,085,688 | B1 * | 8/2006 | Sumida et al. | 703/2 |
| 2003/0026465 | A1 | 2/2003 | Anderson et al. | |
| 2005/0119568 | A1 * | 6/2005 | Salcudean et al. | 600/437 |
| 2006/0285758 | A1 * | 12/2006 | Marugame | 382/236 |

OTHER PUBLICATIONS

Mohr et al., "Volume Modeling of Myocard Deformation with a Spring Mass System", 2003, Springer-Verlag, pp. 332-339.*
Lemkin. P.F., et al., "GELLAB: A Computer System for 2D Gel Electrophoresis Analysis. II. Paring Spots", Computers and Biomedical Research 14, 1981, pp. 355-380.
Panek, Josef, et al., "Point Pattern Matching in the Analysis of Two-Dimensional Gel Electropherograms", Electrophoresis 1999, 20, pp. 3483-3491.
Zhang, Jun, et al., "Face Recognition: Eigenface, elastic Matching, and Neural Nets", Proceedings of the IEEE, IEEE., vol. 85, No. 9, Sep. 1997, pp. 1423-1435.
Van Wamelen, et al., "A Fast Expected Time Algorithm for the 2-D Point Pattern Matching Problem", Pattern Recognition 37, 2004, pp. 1699-1711.

(Continued)

*Primary Examiner*—Michael P. Nghiem
*Assistant Examiner*—Cindy H Khuu

(57) ABSTRACT

Determining a property of a measured peak pattern having at least one peak includes extracting measured peak parameters from the measured peak pattern, and determining deviations of the measured peak parameters from reference values of a reference peak pattern. The reference peak pattern is represented by a spring model, with peak parameters being represented by corresponding springs. Determining a property of a measured peak pattern also includes determining a deformation energy necessary for deforming the reference peak pattern in a way that the deformed reference peak pattern substantially represents the measured peak pattern.

14 Claims, 4 Drawing Sheets

OTHER PUBLICATIONS

Honhtao, Du, et al., "Modeling Mobile-Agent-Based Collaborative Processing in Sensor Networks Using Generalized Stochastic Petri Nets", IEEE International Conference on Systems, Man and Cybernetics, Oct. 2003, vol. 5 of 5, pp. 563-568.

Umeyama, Shinji, "A Point Pattern Matching Algorithm", Systems and Computers in Japan, 1989, No. 10, vol. 20, No. 10, pp. 95-106.

Addario-Berry, Louigi, "2-D Gel Electrophoresis—An Overview, Algorithms for Gene Expression 'Online", May 2002, pp. 1-9.

European Search Report dated May 30, 2005.

* cited by examiner

Fig. 4

| i | $\tilde{t}_i^s$ | $\Delta \tilde{t}_i^s = \tilde{t}_{i+1}^s - \tilde{t}_i^s$ | $\tilde{A}_i^s$ | $\tilde{H}_i^s$ | $k_i^{time}$ | $k_i^{aera}$ | $k_i^{height}$ |
|---|---|---|---|---|---|---|---|
| 1 | 1.00 | 2.96 | 1.15 | 0.40 | 0.70 | 0.70 | 0.70 |
| 2 | 2.96 | 9.28 | 1.03 | 0.45 | 1.00 | 1.00 | 1.00 |
| 3 | 12.24 | 8.72 | 0.98 | 0.63 | 1.00 | 1.00 | 1.00 |
| 4 | 20.96 | 8.05 | 0.97 | 0.90 | 1.00 | 1.00 | 1.00 |
| 5 (Ref) | 29.01 | 15.99 | 1.00 | 1.00 | 1.00 | 1.00 | 1.00 |
| 6 | 45.00 | 13.89 | 1.04 | 1.11 | 1.00 | 1.00 | 1.00 |
| 7 | 58.89 | 10.45 | 1.11 | 1.17 | 1.00 | 1.00 | 1.00 |
| 8 | 69.34 | 15.59 | 1.18 | 1.21 | 1.00 | 1.00 | 1.00 |
| 9 | 84.93 | 5.54 | 1.17 | 1.13 | 1.00 | 0.80 | 0.80 |
| 10 | 90.47 | 3.13 | 1.20 | 1.14 | 0.40 | 0.80 | 0.80 |
| 11 | 93.60 | 6.40 | 1.25 | 1.12 | 1.00 | 0.80 | 0.80 |
| 12 | 100.00 | | 2.10 | 1.65 | | 0.50 | 0.50 |

Fig. 5

| i | $t_i$ | $A_i$ | $H_i$ | $\tilde{t}_i$ | $\Delta \tilde{t}_i = \tilde{t}_{i+1} - \tilde{t}_i$ | $\tilde{A}_i$ | $\tilde{H}_i$ |
|---|---|---|---|---|---|---|---|
| 1 | ... | ... | ... | 0.00 | | | |
| 2 | ... | ... | ... | ... | ... | ... | ... |
| 3 | ... | ... | ... | ... | ... | ... | ... |
| 4 | ... | ... | ... | ... | ... | ... | ... |
| 5(Ref) | ... | Aref | Href | ... | ... | 1.00 | 1.00 |
| 6 | ... | ... | ... | ... | ... | ... | ... |
| 7 | ... | ... | ... | ... | ... | ... | ... |
| 8 | ... | ... | ... | ... | ... | ... | ... |
| 9 | ... | ... | ... | ... | ... | ... | ... |
| 10 | ... | ... | ... | ... | ... | ... | ... |
| 11 | ... | ... | ... | ... | ... | ... | ... |
| 12 | ... | ... | ... | 100.00 | ... | ... | ... |

PEAK PATTERN EVALUATION USING SPRING MODEL

BACKGROUND

The present invention relates to a method for determining a property of a measured peak pattern comprising at least one peak, and to a data evaluation unit adapted for determining a property of a measured peak pattern. The invention further relates to a sample analysis unit.

BRIEF DESCRIPTION OF RELATED DEVELOPMENTS

In a lot of different measurement set-ups, peak patterns of a given sample are acquired. Often, there also exist reference peak patterns that have been determined earlier, or reference peak patterns specified by the manufacturer. The peaks of a peak pattern are generally characterized by a number of different peak attributes such as e.g. peak position, peak height, peak width, peak area, etc. Now, it has to be determined if the measured peak pattern matches with the reference peak pattern.

SUMMARY OF THE EXEMPLARY EMBODIMENTS

It is an object of the invention to improve evaluation of a measured peak pattern. The object is solved by the independent claim(s). Exemplary embodiments are shown by the dependent claim(s).

Embodiments of the invention relate to a method for determining a property of a measured peak pattern comprising at least one peak. The method comprises extracting measured peak parameters from the measured peak pattern, and determining deviations of the measured peak parameters from reference values of a reference peak pattern. Said reference peak pattern is represented by a spring model, with peak parameters being represented by corresponding springs. The method further comprises determining a deformation energy necessary for deforming the reference peak pattern in a way that the deformed reference peak pattern substantially represents the measured peak pattern.

In order to compare the measured peak pattern and the reference peak pattern, the reference peak pattern is represented by a spring model, with each peak parameter of interest being represented by a corresponding spring. The measured peak parameters might deviate from the reference peak parameters. The more the measured peak parameters deviate from reference values specified by the reference peak pattern, the more the corresponding springs will be deformed. Hence, the non-deformed spring model represents the reference peak pattern, whereas the deformed spring model corresponds to the measured peak pattern.

When the spring model is not deformed at all, the corresponding deformation energy is zero. The more the springs are deformed, the higher the corresponding deformation energy. With this regard, the deformation energy is a measure of the degree of deviation between the measured peak pattern and the reference peak pattern. If the total deformation energy is rather low, the measured peak pattern will match with the reference peak pattern. If the total deformation energy is large, there will be a mismatch. Hence, by representing the peak pattern with a spring model, it can be determined how well the measured peak pattern fits with the reference peak pattern. For example, a measured peak pattern might be compared with a number of different reference pattern corresponding to different samples, in order to determine the type of sample that has been measured. A further example is to compare a measured peak pattern with a reference peak pattern provided by a manufacturer. This allows detecting whether the sample has degraded or not.

The spring constants of the spring model can be chosen individually. If it is considered important that a certain measured peak parameter is close to its corresponding reference value, a hard spring having a large spring constant is chosen, whereas a non-critical peak parameter might be represented by a soft spring.

According to a preferred embodiment, the reference value of a certain peak parameter is represented by an equilibrium position of a corresponding spring. If the measured peak parameter of the measured peak pattern is smaller than the peak parameter's reference value, the corresponding spring will have to be compressed in a way that the compressed spring represents the measured spring parameter. If the measured peak parameter is larger than the peak parameter's reference value, the corresponding spring will have to be extended, with the extended spring representing the measured peak parameter. Hence, each of the springs of the spring model is deformed until the deformed spring model matches with the measured peak pattern.

In a further preferred embodiment, the total deformation energy comprises all the energy contributions necessary for deforming the springs of the spring model until their positions match with the measured peak positions of the measured peak pattern. The more a measured peak parameter deviates from its reference value, the larger the deformation of the corresponding spring will be, which in turn leads to a large contribution to the total deformation energy. The total deformation energy is obtained by summing up the energy contributions imposed by the springs of the spring model, with the total deformation energy representing the energy required for deforming the spring model until it matches with the measured peak pattern. Hence, the total deformation energy can be seen as a characteristic measure of the deviation between the measured peak pattern and the reference peak pattern.

According to a preferred embodiment, the peak parameters comprise at least one of peak height, peak area, peak width, time position of a peak, time interval between a peak and a neighbouring peak. For each peak, one or more of these peak parameters are represented by corresponding springs.

According to a further preferred embodiment, one or more of the parameters peak height, peak area, peak width are expressed as relative peak parameters that are determined as a quotient of a peak parameter of a certain peak and a corresponding peak parameter of another peak that has been selected as a scale basis. In this embodiment, instead of evaluating absolute peak parameters, relations between peak parameters are evaluated. For example, the measured peak pattern and the reference peak pattern might have been acquired with measurement set-ups of different sensitivity. In this case, the absolute peak parameters of the measured peak pattern might differ from the absolute peak parameters of the reference peak pattern. However, the ratios between a peak parameter of a certain peak and a peak parameter of a reference peak might agree quite well with their respective reference values.

According to yet another preferred embodiment, in case a peak pattern is acquired as a function of time, the time positions of the various peaks are converted to relative time positions, whereby a relative time scale is established by assigning a start value to the first peak and an end value to the last peak of the peak pattern. Though two peak patterns may substantially be identical, they might have been acquired with different measurement set-ups, and therefore, their absolute time scales might be different. For example, in a first measurement set-up, the time scale might be stretched relative to a time scale of another measurement set-up. By assigning a start value to the first peaks of the peak patterns, an end value to the last peaks of the peak pattern, and interpolated relative time values to all the peaks in between, the effects of stretched or compressed time scales can be compensated.

In a preferred embodiment, both the measured peak pattern and the reference peak pattern relate to a calibration sample. For example, for calibrating a peak pattern analysis unit, so-called "ladders" are used, with said "ladders" comprising a plurality of fragments of different size. By determining the deviation between a measured calibration peak pattern and a reference calibration peak pattern, it can be determined whether the calibration sample is okay or whether it has degraded.

According to a preferred embodiment, peaks of the measured peak pattern are assigned to peaks of the reference peak pattern. For example, the measured peak pattern might comprise more peaks than the reference peak pattern. Before deviations of peak parameters from their reference values can be determined, it is necessary to determine a subset of peaks of the measured peak pattern that are considered relevant. The relevant peaks of the measured peak pattern are assigned to corresponding reference peaks of the reference peak pattern.

Preferably, in case the measured peak pattern comprises n+m peaks, whereas the reference peak pattern comprises n reference peaks, with n, m being natural numbers, the method further comprise: determining, for each possible subset of n out of n+m peaks of the measured peak pattern, a corresponding deformation energy, determining the subset of n out of n+m peaks of the measured peak pattern having the smallest deformation energy.

In an alternatively preferred embodiment, in case the measured peak pattern comprises n+m peaks, whereas the reference peak pattern comprises n reference peaks, with n, m being natural numbers, the method further comprises: determining n+m' highest peaks of the n+m peaks of the measured peak pattern, with m'<m, and m' being a natural number, determining, for each possible subset of n out of n+m' highest peaks of the measured peak pattern, a corresponding deformation energy, determining the subset of n out of n+m' highest peaks of the measured peak pattern having the smallest deformation energy. In this embodiment, the computational burden is reduced by considering n+m' instead of n+m peaks of the measured peak pattern. However, by selecting the n+m' highest peaks of the measured peak pattern, the accuracy is still good.

In a preferred embodiment, the method further comprises determining an energy contribution of a certain peak parameter to the deformation energy as a product of a weighting factor and the squared difference between the measured peak parameter and the reference peak parameter, with the weighting factor representing a spring constant of a respective spring of the spring model. The spring's equilibrium position corresponds to the peak parameter's reference value. Any deviation between the measured peak parameter and its default value corresponds to a deformation of the spring, i.e. the spring is either extended or compressed. The spring energy is determined by multiplying a spring constant with a squared difference between the measured peak parameter and the reference peak parameter. A large spring constant corresponds to a hard spring, because for deforming a hard spring, a lot of energy is necessary. The spring model allows to individually adjust the spring constants of each spring of the spring model.

Preferably, the larger a variance of a peak parameter of the reference peak pattern is, the smaller the corresponding weighting factor is chosen. A peak parameter having a large variance is represented by a soft spring, in order to allow for some degree of deviation. However, a peak parameter with a small variance is represented by a hard spring.

In a preferred embodiment, the method further comprises weighting one or more of the energy contributions related to peak heights, peak areas, peak widths, time positions of a peak, time intervals between adjacent peaks with overall weighting factors. When measuring protein samples, measured migration times are quite accurate, whereas both peak area and peak height vary considerably. Accordingly, for evaluating protein peak patterns, the weighting factor related to migration time is set to a rather high value, whereas the weighting factors related to peak area and peak height are set to small values. However, in case of DNA fragments, migration times vary considerably, whereas both peak area and peak height can be determined with high accuracy. Accordingly, in case of DNA samples, the weighting factor related to migration time is set to a small value, whereas both the weighting factors related to peak area and to peak height are set to large values.

In a preferred embodiment, the method further comprises comparing the deformation energy with a predefined threshold, whereby in case the total deformation energy is below the threshold, the measured peak pattern is identified to match with the reference peak pattern. The total deformation energy is a characteristic measure indicating how much the measured peak pattern deviates from the reference peak pattern. If the total deformation energy remains below a threshold, a match is identified.

According to a preferred embodiment, the method further comprises comparing the deformation energy with a first predefined threshold, and comparing, for each peak of the measured peak pattern, the peak's energy contribution with a second predefined threshold, whereby in case the deformation energy remains below the first threshold and the peaks' energy contributions all remain below the second threshold, the measured peak pattern is identified to match with the reference peak pattern. In this embodiment, it is separately determined for each peak whether the peak's attributes agree well with their reference values.

In a preferred embodiment, peaks of the measured peak pattern relate to compounds of a fluid sample that have been separated in a separation flow path.

Further preferably, the measured peak pattern is obtained by detecting fluorescence intensity of compounds of a fluid sample that are separated in a separation flow path. Species of interest are labelled with fluorescent marker tags, and then, peak patterns are recorded by detecting fluorescence intensity as a function of time.

In a preferred embodiment, the measured peak pattern is one of an electropherogram, a chromatogram, an electrochromatogram.

Embodiments further relate to a data evaluation unit adapted for determining a property of a measured peak pattern. The data evaluation unit comprises an extracting unit adapted for extracting measured peak parameters from the measured peak pattern, and a deformation energy evaluation unit adapted for determining deviations of the measured peak parameters from reference values of a reference peak pattern. The reference peak pattern is represented by a spring model, with peak parameters being represented by corresponding springs. The deformation energy evaluation unit is further adapted for determining a deformation energy necessary for deforming the reference peak pattern in a way that the deformed reference peak pattern substantially represents the measured peak pattern.

Embodiments further relate to a sample analysis unit comprising a separation flow path adapted for separating compounds of a fluid sample; a detection unit adapted for determining a measured peak pattern related to the separated compounds, and a data analysis unit as described above.

Embodiments can be partly or entirely embodied or supported by one or more suitable software programs, which can be stored on or otherwise provided by any kind of data carrier, and which might be executed in or by any suitable data processing unit. Software programs or routines are preferably applied for one or more of the following tasks: for extracting measured peak parameters from the measured peak pattern, for determining deviations of the measured peak parameters from reference values of a reference peak pattern, for determining a deformation energy necessary for deforming the reference peak pattern in a way that the deformed reference peak pattern substantially represents the measured peak pattern.

BRIEF DESCRIPTION OF THE DRAWINGS

Other objects and many of the attendant advantages of embodiments of the present invention will be readily appreciated and become better understood by reference to the following more detailed description of preferred embodiments in connection with the accompanied drawing(s). Features that are substantially or functionally equal or similar will be referred to with the same reference sign(s).

FIG. 4 shows a table with reference data related to a reference peak pattern;

FIG. 5 shows a table with measured data related to a measured peak pattern.

DETAILED DESCRIPTION OF THE EXEMPLARY EMBODIMENTS

Figure 1:
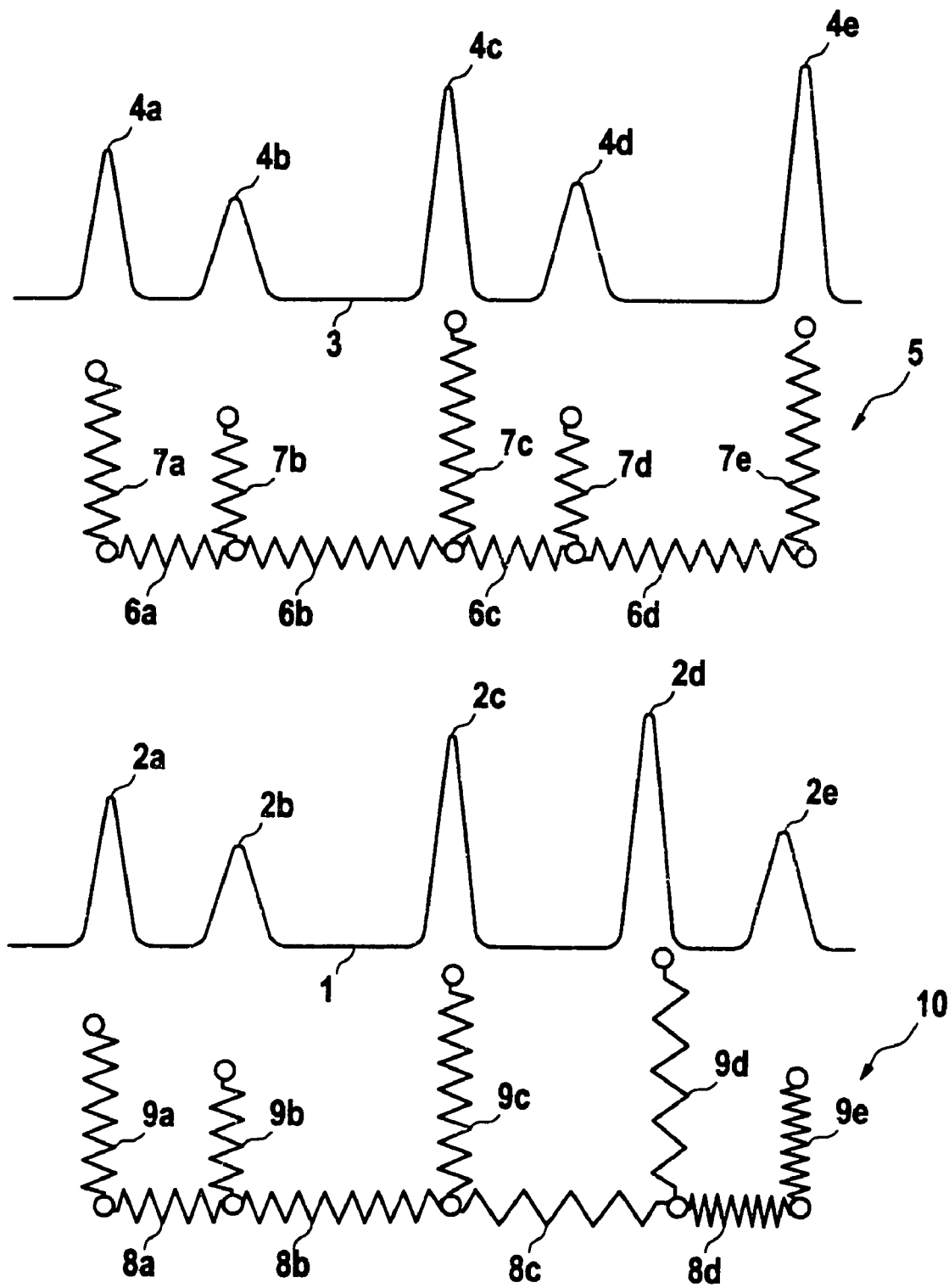
FIG. 1 shows a measured signal and a reference peak pattern, with the reference peak pattern being represented by a spring model.

In the lower part of FIG. 1, a measured signal 1 is shown, which has been acquired as a function of time. The measured signal comprises a set of peaks 2a to 2e, with each of the peaks being characterized by peak parameters such as e.g. time position of the peak, time interval between adjacent peaks, peak height, peak area, half width of the peak, etc. There exist a variety of different applications where it is necessary to compare the measured signal 1 with one or more predefined reference patterns, e.g. with the reference pattern 3 shown in the upper part of FIG. 1. The reference pattern 3 comprises a set of reference peaks 4a to 4e, and for each one of the reference peaks, various reference parameters such as e.g. reference peak position, time interval between two subsequent reference peaks, reference peak height, reference peak area, half width of the reference peak, etc. are specified.

According to embodiments of the present invention, a reference peak pattern 3 is represented by a spring model 5, with the spring model 5 comprising a respective spring for each reference peak parameter of the reference peak pattern. In the example of FIG. 1, the reference peak parameters "time interval between neighbouring peaks" and "peak height" are known for each one of the reference peaks 4a to 4e. Springs 6a to 6d of the spring model 5 represent time intervals between adjacent reference peaks, whereby the spring's equilibrium positions correspond the reference values of these time intervals. Similarly, springs 7a to 7e represent respective peak heights of the reference peaks 4a to 4e, and the equilibrium positions of the springs 7a to 7e correspond to reference peak heights of the reference peaks 4a to 4e.

Generally, the measured peak parameters of the measured signal 1 deviate from the corresponding reference values of the reference peak pattern 3. According to embodiments of the invention, this deviation can be expressed in terms of a deformation of the spring model 5, with the springs being deformed such that their deformed positions represent the measures peak parameters. The deviation between the measured peak pattern and the reference peak pattern can be expressed in terms of a deformation energy indicating the total energy required for deforming the springs of the spring model.

For example, the time position of the measured peak 2d is shifted to the right relative to the time position of the corresponding reference peak 4d. Accordingly, the time interval between the measured peaks 2c and 2d is increased relative to its reference time interval. This increase is represented by a deformation of spring 6c, with deformed spring 8c representing the time interval that has actually been measured. The time interval between the measured peaks 2d, 2e is smaller than the corresponding reference time interval. Accordingly, spring 6d is compressed, with deformed spring 8d representing the reduced distance between the measured peaks 2d, 2e.

The peak height of measured peak 2d exceeds the reference peak height of reference peak 4d, and accordingly, spring 7d is extended, with deformed spring 9d representing the peak height of measured peak 2d. In contrast, the peak height of measured peak 2e is smaller than the reference peak height of reference peak 4e. Spring 7e of the spring model 5 is compressed, with deformed spring 9e representing the reduced peak height of measured peak 2e. The other peak positions and peak heights of the measured peak pattern 1 are substantially in agreement with the corresponding peak parameters of the reference peak pattern 3. Hence, the springs 8a, 8b, 9a, 9b, 9c are substantially at their equilibrium positions.

Next, a total deformation energy required for transforming the equilibrium spring model 5 into a deformed spring model 10 is computed. For this purpose, individual spring constants indicating the respective hardness of a spring may be assigned to each one of the springs 6a to 6d, 7a to 7e. The total deformation energy is obtained by summing up the energy contributions required for deforming the springs 6a to 6d, 7a to 7e in a way that they represent the measured peak pattern 1. The total deformation energy indicates how much the measured peak pattern 1 deviates from the reference peak pattern 3. A small value of the total deformation energy indicates that the measured signal matches with the reference peak pattern, whereas a large mismatch is characterized by a large value of the total deformation energy.

Figure 2:
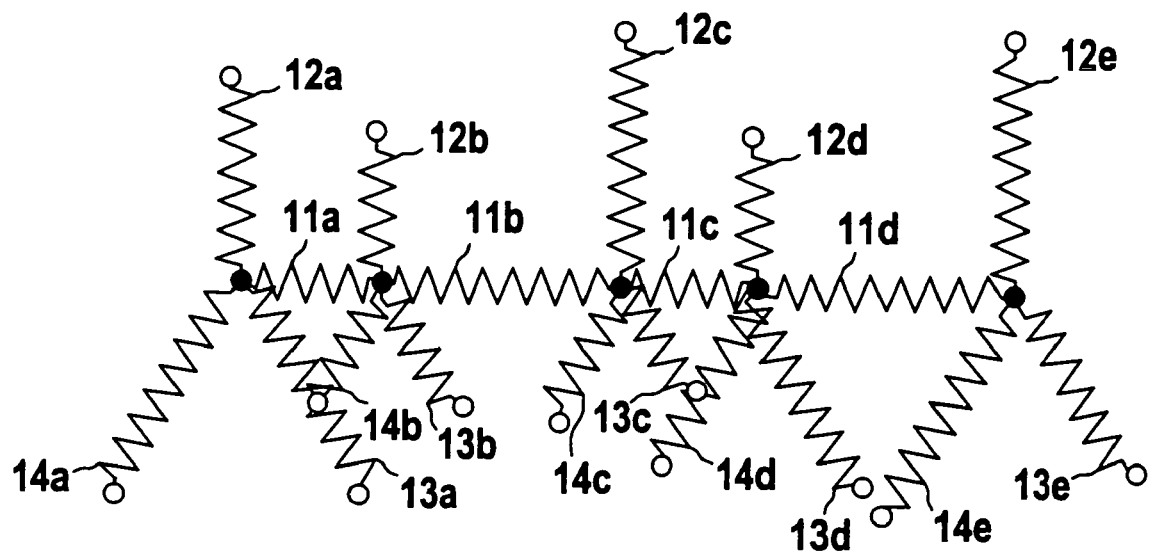
FIG. 2 depicts a multi-dimensional spring model.
Figure 2:
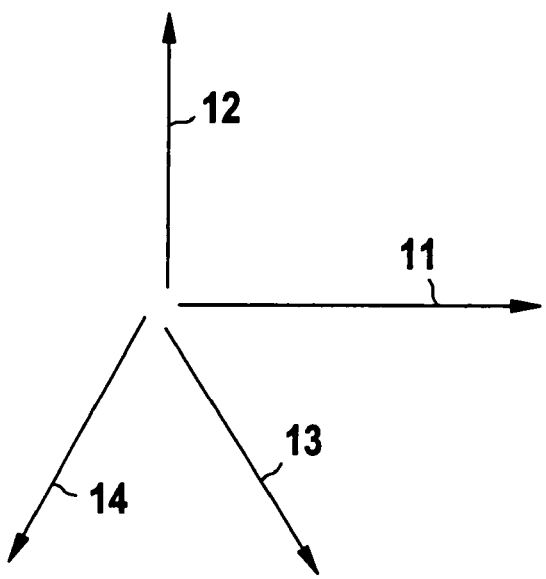

In the example of FIG. 1, a two-dimensional spring model 5 has been used for evaluating the two peak parameters "time intervals between adjacent peaks" and "peak height". However, as shown in FIG. 2, the concept of a spring model can be generalized to any desired number of peak parameters, with the springs' equilibrium positions corresponding to reference values of a reference peak pattern. The first axis 11 relates to the peak parameter "time intervals between adjacent peaks", whereby the springs 11a to 11d represent reference time intervals according to the reference peak pattern. The second axis 12 relates to the peak parameter "peak height", with the springs 12a to 12e representing peak heights of the reference peaks. A third axis 13 is related to the peak parameter "peak width", with reference peak widths of the reference peak pattern being represented by a corresponding set of springs 13a to 13e. The fourth axis 14 is related to the peak parameter "peak area", which is obtained by integrating the area of a certain peak. The equilibrium positions of the corresponding springs 14a to 14e represent reference peak areas according to a reference peak pattern.

To each of the springs 11a to 11d, 12a to 12e, 13a to 13e and 14a to 14e, an individual spring constant $k_{i,j}$ is assigned, with i, j being natural numbers, with i denoting the peak number, and with j denoting a respective peak parameter like migration time, time interval between adjacent peaks, peak height, peak width, peak area.

It should be clear that the concept of a multi-dimensional spring model, with each dimension corresponding to a certain peak attribute, can be used for representing any desired set of peak attributes, whereby the number of dimensions of the spring model is chosen according to the number of peak attributes of interest.

Figure 3:
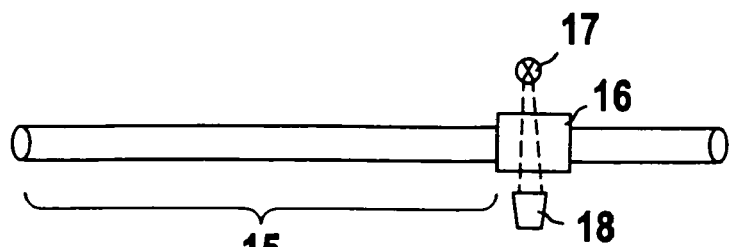
FIG. 3 shows a measurement set-up for separating and analysing different species of a fluid sample.

In the following, it will be discussed how the above-described method can be applied for evaluating peak patterns obtained by detecting sample compounds of fluid samples, with the reference peak patterns corresponding to well-known reference samples. FIG. 3 shows a measurement set-up adapted for separating and detecting compounds of a fluid sample. The measurement set-up comprises a separation flow path 15 adapted for separating compounds of a fluid sample provided to an inlet of the separation flow path 15. For example, for separating compounds of the fluid sample, one of the following techniques might be used: liquid chromatography, electrophoresis, electrochromatography. At the outlet of the separation flow path 15, various separate sample bands are obtained as a function of time, with each of the sample bands being related to a characteristic migration time of the respective compound. After having been separated, the sample bands pass through a detection cell 16 adapted for detecting the sample bands as a function of time. For example, the detection cell 16 might be implemented as a fluorescence detection cell adapted for detecting fluorescence labelled species, with the fluorescence detection cell 16 comprising a fluorescence light source 17 and a fluorescence detection unit 18. Alternatively, a detection cell adapted for detecting an electrical property, such as e.g. conductivity, might be utilized.

Both in the field of separating DNA fragments and separating protein fragments, calibration samples comprising a set of well-known fragments are used for calibrating a sample separation system. Calibration samples are used for determining a calibration peak pattern before an unknown DNA sample or protein sample is analyzed. Because the calibration peak pattern looks like a "ladder" of peaks related to the various fragments, calibration samples are commonly referred to as "ladders". The reference data for the calibration samples might e.g. be provided by a manufacturer of the calibration samples.

For example, a DNA calibration sample might comprise between 10 and 20 DNA fragments of different size. Similarly, a protein calibration sample comprises a set of different protein fragments. The DNA or protein calibration samples allow to calibrate sample peak patterns in units related to DNA or protein base pairs.

Analyzing a measured peak pattern with the above-described spring model is well-suited for evaluating the quality of calibration samples. The table shown in FIG. 4 indicates reference peak parameters of a calibration sample. The reference data for the calibration samples might e.g. be provided by a manufacturer of the calibration samples. The reference data shown in FIG. 4 has been obtained by determining a large number of reference peak patterns of the calibration sample (e.g. 100 measurements), and by deriving, from the reference peak patterns, average values and standard deviations of the reference peak parameters.

In the table's first column, for each of the 12 peaks of the reference peak pattern, a respective peak index i is indicated. In the second column, for each one of the 12 peaks, a relative migration time $\tilde{t}_i^S$ is provided, whereby the relative migration times $\tilde{t}_i^S$ are derived from the measured migration times $t_i$ as follows: The relative migration time related to the first peak (i=1) is set to $\tilde{t}_1^S$=0.00, and the relative migration time of the last peak (i=12) is set to $\tilde{t}_{12}^S$=100.00. The relative migration times of all the other peaks (i=2 to i=11) are determined as $$\tilde{t}_i^S = \left(\frac{t_i}{t_n - t_1}\right)_{averaged},$$

with 1<i<n, and with $t_1$, $t_i$, $t_n$ denoting measured time positions of the peaks. From these relative time positions $\tilde{t}_i^S$ of the peaks, relative time intervals between adjacent peaks can be derived. In the third column of FIG. 4, time intervals $\Delta\tilde{t}_i^S = \tilde{t}_{i+1}^S - \tilde{t}_i^S$ between peak i and peak (i+1) are given for each one of peaks 1 to 11. These time intervals are important parameters for analyzing a measured peak pattern.

In the fourth and the fifth column, the relative area $\tilde{A}_i^S$ and the relative height $\tilde{H}_i^S$ of the peaks are indicated, respectively. For determining relative peak areas $\tilde{A}_i^S$, the peaks' absolute areas $A_i$ are related to the absolute peak area $A_{ref}$ of a peak that is selected as a scale basis:

$$\tilde{A}_i^S = \frac{A_i}{A_{ref}}.$$

The peak parameters of the peak selected as a scale basis must not fluctuate too much. Preferably, a peak that is characterized by small standard deviations of the relevant peak parameters is selected. In the example shown in FIG. 4, the fifth peak (i=5) is chosen as a scale basis. Similarly, the peaks' relative heights $\tilde{H}_i^S$, which are shown in the fifth column, are determined as $$\tilde{H}_i^S = \frac{H_i}{H_{ref}},$$

$1 \leq i \leq 12$, with $H_i$ denoting an absolute height of peak i, and with $H_{ref}$ denoting an absolute height of the peak that has been selected as a scale basis.

For each peak parameter and each peak, an individual spring constant may be specified. In column six, spring constants $k_i^{time}$ related to the parameter "relative migration time" are specified on a per-peak basis. The spring constants are adapted for scaling the contributions of certain peak parameters to the overall deformation energy. A small spring constant indicates that the corresponding spring is rather soft, and that the peak parameter's contribution to the overall deformation energy is rather small. In contrast, a large spring constant corresponds to a hard spring. The spring constant for a certain peak parameter might e.g. be specified manually on a per-peak basis. Alternatively, the spring constants might be set in dependence on the standard deviations of the various peak parameters. If the standard deviation of a certain peak parameter is rather high, the corresponding spring constant will be set to a rather small value, and vice versa. In columns seven and eight, spring constants $k_i^{area}$, $k_i^{height}$ related to the peak parameters "relative area" and "relative height" are provided for each one of peaks 1 to 12, respectively. The spring constants $k_i^{time}$, $k_i^{area}$, $k_i^{height}$ of the reference peak (i=5) are set to 1.00, respectively.

A calibration sample comprising a set of different fragments might be subjected to degradation in the course of time. In order to determine whether the calibration sample, which might e.g. be a DNA standard comprising a set of different DNA fragments, is still okay, a peak pattern of the calibration standard is acquired and compared with reference data provided by the manufacturer. FIG. 5 shows a result table for such a measurement. In the first column of the table shown in FIG. 5, the peak index i ranging from 1 to 12 is indicated. For each peak, the migration time $t_i$ is measured and written to the table's second column. Furthermore, for each peak i, a peak area $A_i$ and a peak height $H_i$ are measured and written to columns 3 and 4 of the table, respectively. Next, the measured migration times $t_i$, $1 \leq i \leq 12$, are converted to a relative time scale. The first peak's relative migration time $\tilde{t}_1$ is set to 0.00, and the last peak's relative migration time $\tilde{t}_{12}$ is set to 100.00. For all the peaks in-between, the relative migration time $\tilde{t}_i$ is set to $$\tilde{t}_i = \frac{t_i}{t_n - t_1},$$

$2 \leq i \leq 11$, with $t_1$, $_n$, $t_n$ denoting measured migration times. After the relative migration times $\tilde{t}_i$ have been written to the fifth column, time intervals $\Delta \tilde{t}_i = \tilde{t}_{i+1} - \tilde{t}_i$ between adjacent peaks can be derived there from. The relative time intervals $\Delta \tilde{t}_i$ are written to column 6. Furthermore, the measured area $A_i$ is converted to a relative area $$\tilde{A}_i = \frac{A_i}{A_{ref}},$$

$1 \leq i \leq 12$, with $A_{ref}$ denoting the measured area of the fifth peak (i=5), which is chosen as a scale basis. The measured heights $H_i$ are converted into corresponding relative heights $$\tilde{H}_i = \frac{H_i}{H_{ref}},$$

$1 \leq i \leq 12$, with $H_{ref}$ denoting the measured height of the fifth peak. The relative areas $\tilde{A}_i$ and the relative heights $\tilde{H}_i$ are written to columns seven and eight of the table, respectively.

As soon as both the measured peak parameters of FIG. 5 and the reference peak parameters of FIG. 4 are known, the total deformation energy of the springs that represent the various peak parameters can be determined. The measured peak parameters of FIG. 4 correspond to the springs' deformed positions, whereas the reference peak parameters of FIG. 4 relate to equilibrium positions of the respective springs. For each spring, the spring force is obtained as $F = -k \cdot (x - x^S)$, with x denoting a measured peak parameter, with $x^S$ denoting a reference peak parameter, and with k being the spring constant. The spring's contribution to the total deformation energy is $E = k \cdot (x - x^S)^2$.

The summed-up energy contribution $E^{time}$ can be expressed as $$E^{time} = W^{time} \cdot \sum_{i=1}^{n-1} k_i^{time} \cdot \left( \frac{\Delta \tilde{t}_i - \Delta \tilde{t}_i^S}{\Delta \tilde{t}_i^S} \right)^2,$$

with n denoting the number of peaks of the peak pattern, with $W^{time}$ being an overall weighting factor, with $k_i^{time}$ being respective spring constants, with $\Delta \tilde{t}_i$ denoting measured time intervals as indicated in the sixth column of FIG. 5, and with $\Delta \tilde{t}_i^S$ denoting reference time intervals as indicated in the third column of FIG. 4.

Similarly, the summed-up energy contribution $E^{area}$ related to peak areas can be written as $$E^{area} = W^{area} \cdot \sum_{i=1}^{n} k_i^{area} \cdot \left( \frac{\tilde{A}_i - \tilde{A}_i^S}{\min(\tilde{A}_i, \tilde{A}_i^S)} \right)^2,$$

with $k_i^{area}$ denoting respective spring constants, with $W^{area}$ being an overall weighting factor, with $\tilde{A}_i$ being a measured relative peak area as indicated in column seven of FIG. 5, and with $\tilde{A}_i^S$ being the corresponding reference peak area as indicated in the fourth column of FIG. 4. By including a denominator $\min(\tilde{A}_i, \tilde{A}_i^S)$, it is made sure that a peak with twice the area of the expected peak results in the same energy as a peak with half the area of the expected peak. This corresponds to the behavior of a non-linear spring.

The energy contribution $E^{height}$ related to peak heights can be written as $$E^{height} = W^{height} \cdot \sum_{i=1}^{n} k_i^{height} \cdot \left( \frac{\tilde{H}_i - \tilde{H}_i^S}{\min(\tilde{H}_i, \tilde{H}_i^S)} \right)^2$$

with $k_i^{height}$ being a respective spring constant, with $W^{height}$ being an overall weighting factor, with $\tilde{H}_i$ being the measured relative peak height as indicated in column eight of FIG. 5, and with $\tilde{H}_i^S$ denoting reference peak heights as indicated in column five of FIG. 4.

By adding the above-described energy contributions $E^{time}$, $E^{area}$ and $E^{height}$, the total deformation energy $E^{total} = E^{time} + E^{area} + E^{height}$ is obtained. The total deformation energy is a characteristic measure indicating a degree of deviation between the measured peak pattern and the reference peak pattern. If the total deformation energy remains below a predefined threshold, the measured peak pattern will be identified to match with the reference peak pattern. If the total deformation energy is above the threshold, a mismatch between the measured peak pattern and the reference peak pattern will be identified.

The above described spring model allows evaluating the quality of protein or DNA calibration samples. In order to find out whether the calibration sample has degraded, the calibration peak pattern is compared with a reference peak pattern. When measuring protein samples, measured migration times are quite accurate, whereas both peak area and peak height may vary considerably. Accordingly, for evaluating protein peak patterns, the weighting factor $W^{time}$ is set to a rather high value, whereas the weighting factors $W^{area}$, $W^{height}$ are set to small values. When measuring peak patterns related to DNA samples, the situation is different. In case of DNA fragments, migration times may vary considerably, whereas both peak area and peak height can be determined with high accuracy. Accordingly, in case of DNA samples, the weighting factor $W^{time}$ is set to a small value, whereas both $W^{area}$ and $W^{height}$ are set to large values, in order to enhance the respective contributions $E^{area}$ and $E^{height}$ to the total deformation energy $E^{total}$. In general, the more reproducible a peak parameter can be determined, the larger the corresponding weighting factor $W^i$ should be chosen.

In order to evaluate whether a protein or DNA "ladder" has degraded or not, the total deformation energy $E^{total}$ is compared with a predefined threshold. If the total deformation energy remains below the threshold, the calibration sample can still be used. In contrast, if the total deformation Energy $E^{total}$ is above the threshold, the calibration sample cannot be used anymore. Furthermore, for each peak i, the peak's individual contribution $E_i^{individual}=E_i^{time}+E_i^{area}+E_i^{height}$ to the total deformation energy might be compared with a predefined threshold as well. Only if both the total deformation energy remains below its respective threshold and each of the peaks' individual energy contributions $E_i^{individual}$, $1\leq i\leq n$, remain below their respective thresholds, the sample's quality will be determined as being okay.

The number of peaks of the measured peak pattern might exceed the number of peaks of the reference peak pattern represented by the spring model. For example, in case the ladder specification contains n peaks, whereas (n+m) peaks are detected, the question arises how to calculate the deformation energy. One possible approach is to calculate the deformation energy for each possible selection of n out of the (n+m) measured peaks, and to determine which one of the $$\binom{n+m}{n} = \frac{(n+m)!}{n! \cdot m!}$$

possible peak combinations results in the lowest possible deformation energy. This combination of n out of (n+m) measured peaks fits best to the ladder specification. Next, the total deformation energy of this peak combination is compared with a threshold value. If the energy of this peak combination does not exceed the threshold, the calibration sample or "ladder" will be determined as being okay.

However, the number of possible peak combinations $$\binom{n+m}{n}$$

grows rapidly with m, and the computational burden might not be acceptable. One strategy for limiting the computational burden is to determine the (n+m') highest peaks of the measured peak pattern, with m'<m, whereby only peak combinations out of the n+m' highest peaks are considered. Another approach is to use genetic algorithms for selecting n out of (n+m) measured peaks.

Figure 6:
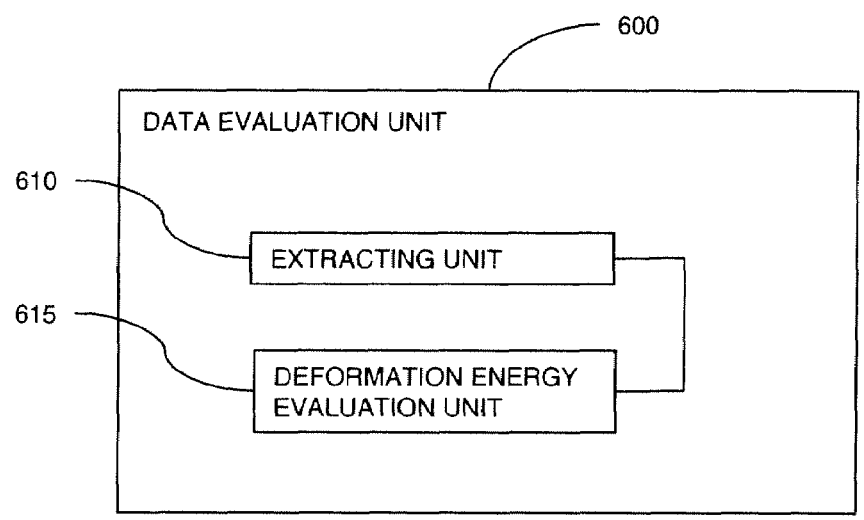
FIG. 6 depicts a data evaluation unit according to the disclosed embodiments.

The present embodiments may also include a data evaluation unit 600 as shown in FIG. 6. The data evaluation unit may be adapted for determining a property of a measured peak pattern. The data evaluation unit 600 may include an extracting unit 610 adapted for extracting measured peak parameters from the measured peak pattern. The data evaluation unit 600 may also include a deformation energy evaluation unit 615 adapted for determining deviations of the measured peak parameters from reference values of a reference peak pattern, said reference peak pattern being represented by a spring model, with peak parameters being represented by corresponding springs. The deformation energy evaluation unit 615 may further be adapted for determining a deformation energy necessary for deforming the reference peak pattern in a way that the deformed reference peak pattern substantially represents the measured peak pattern.

Figure 7:
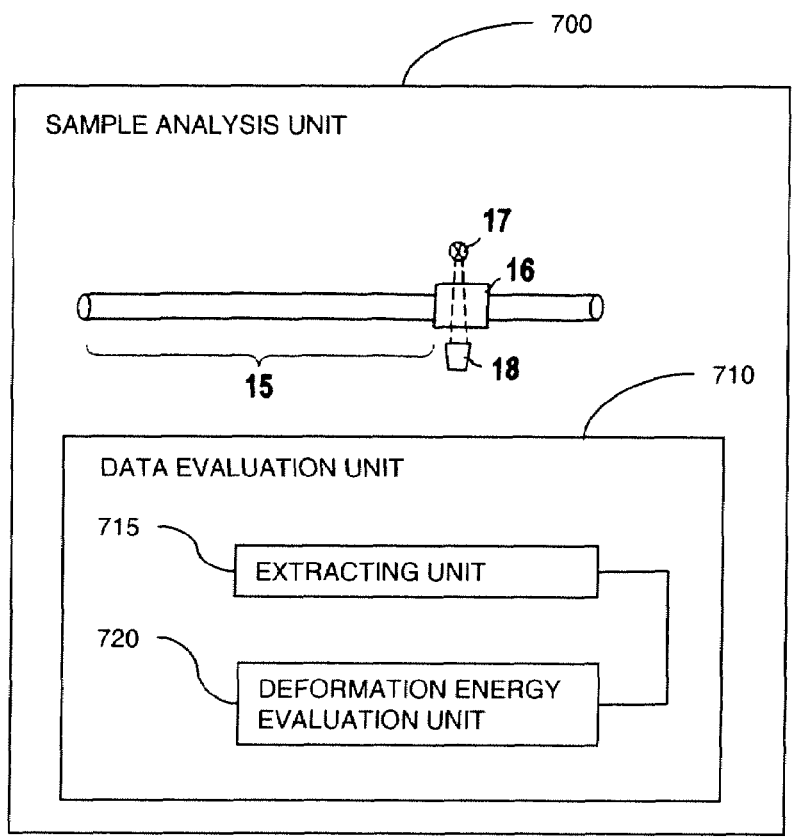
FIG. 7 depicts a sample analysis unit according to the disclosed embodiments.

The present embodiments may also include a sample analysis unit 700 as shown in FIG. 7. The sample analysis unit 700 may include a separation flow path 15 and a detection unit 16, as previously shown in FIG. 3. The separation flow path 15 may be adapted for separating compounds of a fluid sample and the detection unit 16 may be adapted for determining a measured peak pattern related to the separated compounds. The sample analysis unit 700 may also include a data evaluation unit 710, similar to data evaluation unit 600, adapted for determining a property of a measured peak pattern. The data evaluation unit 710 may include an extracting unit 715 adapted for extracting measured peak parameters from the measured peak pattern and a deformation energy evaluation unit 720 adapted for determining deviations of the measured peak parameters from reference values of a reference peak pattern, the reference peak pattern being represented by a spring model, with peak parameters being represented by corresponding springs. The deformation energy evaluation unit 720 is further adapted for determining a deformation energy necessary for deforming the reference peak pattern in a way that the deformed reference peak pattern substantially represents the measured peak pattern.

What is claimed is:

1. A method for determining a property of a measured peak pattern comprising at least one peak, the method comprising:
    extracting measured peak parameters from the measured peak pattern using an extracting unit,
    determining deviations of the measured peak parameters from reference values of a reference peak pattern using a deformation energy evaluation unit, said reference peak pattern being represented by a spring model, with peak parameters being represented by corresponding springs, and
    determining a deformation energy necessary for deforming the reference peak pattern in a way that the deformed reference peak pattern substantially represents the measured peak pattern.

2. The method of claim 1, further comprising at least one of the following features:
    equilibrium positions of the springs correspond to the reference values of the peak parameters according to the reference peak pattern;
    the deformation energy comprises energy contributions necessary for deforming the respective springs from the equilibrium positions to deformed positions that correspond to the measured peak parameters.

3. The method of claim 1, comprising at least one of the features:
    the peak parameters comprise at least one of peak height, peak area, peak width, time position of a peak, time interval between a peak and a subsequent peak;

the peak parameters comprise at least one of relative peak height, relative peak width, relative peak area, which indicate the relationship between a measured peak's respective height, width, area and height, width, area of a predefined peak of the measured peak pattern;

the measured peak pattern is a calibration peak pattern of a ladder sample comprising a set of fragments.

4. The method of claim 1, further comprising at least one of:

assigning a relative time scale to the time positions of the measured peaks, with a start value being assigned to the first peak, and with an end value being assigned to the last peak;

assigning peaks of the measured peak pattern to reference peaks of the reference peak pattern.

5. The method of claim 1, wherein, in case the measured peak pattern comprises n+m peaks, whereas the reference peak pattern comprises n reference peaks, with n, m being natural numbers, the method further comprises:

determining, for each possible subset of n out of n+m peaks of the measured peak pattern, a corresponding deformation energy; and determining the subset of n out of n+m peaks of the measured peak pattern having the smallest deformation energy.

6. The method of claim 1, wherein, in case the measured peak pattern comprises n+m peaks, whereas the reference peak pattern comprises n reference peaks, with n, m being natural numbers, the method further comprises:

determining n+m' highest peaks of the n+m peaks of the measured peak pattern, with m'<m, and m' being a natural number;

determining, for each possible subset of n out of n+m' highest peaks of the measured peak pattern, a corresponding deformation energy; and determining the subset of n out of n+m' highest peaks of the measured peak pattern having the smallest deformation energy.

7. The method of claim 1, further comprising determining an energy contribution of a certain peak parameter to the deformation energy as a product of a weighting factor and the squared difference between the measured peak parameter and the reference peak parameter, with the weighting factor representing a spring constant of a respective spring of the spring model.

8. The method of claim 7, wherein, the larger a variance of a peak parameter of the reference peak pattern is, the smaller the corresponding weighting factor is chosen.

9. The method of claim 1, further comprising at least one of:

weighting one or more of the energy contributions related to peak heights, peak areas, peak widths, time positions of a peak, time intervals between adjacent peaks with overall weighting factors;

comparing the deformation energy with a predefined threshold, whereby in case the total deformation energy is below the threshold, the measured peak pattern is identified to match with the reference peak pattern;

comparing the deformation energy with a first predefined threshold, and comparing, for each peak of the measured peak pattern, the peak's energy contribution with a second predefined threshold, whereby in case the deformation energy remains below the first threshold and the peaks' energy contributions all remain below the second threshold, the measured peak pattern is identified to match with the reference peak pattern.

10. The method of claim 1, further comprising at least one of the following features:

peaks of the measured peak pattern relate to compounds of a fluid sample that have been separated in a separation flow path;

the measured peak pattern is obtained by detecting fluorescence intensity of compounds of a fluid sample that are separated in a separation flow path;

the measured peak pattern is obtained as a function of time;

the measured peak pattern is one of an electropherogram, a chromatogram, an electrochromatogram.

11. A data evaluation unit adapted for determining a property of a measured peak pattern, the data evaluation unit comprising:

an extracting unit adapted for extracting measured peak parameters from the measured peak pattern;

a deformation energy evaluation unit being adapted for determining deviations of the measured peak parameters from reference values of a reference peak pattern, said reference peak pattern being represented by a spring model, with peak parameters being represented by corresponding springs; and the deformation energy evaluation unit being further adapted for determining a deformation energy necessary for deforming the reference peak pattern in a way that the deformed reference peak pattern substantially represents the measured peak pattern.

12. The data evaluation unit of claim 11, further comprising at least one of the features:

an assigner adapted for assigning peaks of the measured peak pattern to reference peaks of the reference peak pattern;

a comparison unit adapted for comparing the total deformation energy with a predetermined threshold, whereby in case the total deformation energy is below the threshold, the measured peak pattern is identified to match with the reference peak pattern.

13. A sample analysis unit comprising a separation flow path adapted for separating compounds of a fluid sample;

a detection unit adapted for determining a measured peak pattern related to the separated compounds; and a data evaluation unit adapted for determining a property of a measured peak pattern, the data evaluation unit comprising;

an extracting unit adapted for extracting measured peak parameters from the measured peak pattern; and a deformation energy evaluation unit being adapted for determining deviations of the measured peak parameters from reference values of a reference peak pattern, said reference peak pattern being represented by a spring model, with peak parameters being represented by corresponding springs;

the deformation energy evaluation unit being further adapted for determining a deformation energy necessary for deforming the reference peak pattern in a way that the deformed reference peak pattern substantially represents the measured peak pattern.

14. The sample analysis unit of claim 13, comprising at least one of the features:

the separation flow path is one of an electrophoresis flow path, a chromatography flow path, an electrochromatography flow path;

the detection unit is a fluorescence detection unit adapted for detecting fluorescence intensity of sample compounds that have been separated in the preceding separation flow path.

* * * * *